(12) United States Patent
Izumi et al.

(10) Patent No.: US 11,480,081 B2
(45) Date of Patent: **\*Oct. 25, 2022**

(54) POROUS CERAMIC STRUCTURE

(71) Applicant: NGK INSULATORS, LTD., Nagoya (JP)

(72) Inventors: Yunie Izumi, Nisshin (JP); Kennichi Hidaka, Nagoya (JP); Akihiro Miura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/303,965

(22) Filed: Jun. 11, 2021

(65) Prior Publication Data

US 2021/0301696 A1 Sep. 30, 2021

Related U.S. Application Data

(63) Continuation of application No. PCT/JP2020/000680, filed on Jan. 10, 2020.

(30) Foreign Application Priority Data

Jan. 21, 2019 (JP) .............................. JP2019-007709

(51) Int. Cl.
*C04B 35/195* (2006.01)
*F01N 3/022* (2006.01)
(Continued)

(52) U.S. Cl.
CPC .......... *F01N 3/0222* (2013.01); *C04B 35/195* (2013.01); *F01N 3/0842* (2013.01);
(Continued)

(58) Field of Classification Search
CPC .. F01N 3/0222; F01N 3/2066; F01N 2330/06; C04B 35/195; C04B 2235/3229;
(Continued)

(56) References Cited

U.S. PATENT DOCUMENTS

| 10,252,246 B2 * | 4/2019 | Izumi | B01J 21/04 |
| 10,252,248 B2 * | 4/2019 | Izumi | B01J 37/08 |

(Continued)

FOREIGN PATENT DOCUMENTS

| JP | 2011-525855 A1 | 9/2011 |
| JP | 2013-027858 A1 | 2/2013 |

(Continued)

OTHER PUBLICATIONS

International Search Report and Written Opinion (Application No. PCT/JP2020/000680) dated Feb. 10, 2020.

(Continued)

*Primary Examiner* — Tom P Duong
(74) *Attorney, Agent, or Firm* — Burr & Brown, PLLC (57) ABSTRACT

When the porous ceramic structure contains Co together with Fe or Mn, the Co content is higher than or equal to 0.1 mass % and lower than or equal to 3.0 mass % in terms of $Co_3O_4$, and when the porous ceramic structure contains Co without containing Fe and Mn, the Co content is higher than or equal to 0.2 mass % and lower than or equal to 6.0 mass % in terms of $Co_3O_4$. The ratio of the sum of the Fe content in terms of $Fe_2O_3$, the Mn content in terms of $Mn_2O_3$, and the Co content in terms of $Co_3O_4$ to the Ce content in terms of $CeO_2$ is higher than or equal to 0.8 and lower than or equal to 9.5.

6 Claims, 7 Drawing Sheets

(51) Int. Cl.
*F01N 3/08* (2006.01)
*F01N 3/20* (2006.01)
*F01N 3/28* (2006.01)

(52) U.S. Cl.
CPC ......... *F01N 3/0857* (2013.01); *F01N 3/2066* (2013.01); *F01N 3/28* (2013.01)

(58) Field of Classification Search
CPC .... C04B 2235/3262; C04B 2235/3274; C04B 2235/3275; C04B 2235/3277; B01D 39/20; B01J 23/889; B01J 35/04
USPC .......................................................... 55/523
See application file for complete search history.

(56) References Cited

U.S. PATENT DOCUMENTS

| | | |
|---|---|---|
| 2009/0324469 A1 | 12/2009 | Golden et al. |
| 2014/0020877 A1* | 1/2014 | Suzuki ...................... F28F 1/02 165/181 |
| 2014/0370232 A1* | 12/2014 | Izumi .................. C04B 38/0006 428/116 |
| 2015/0005160 A1 | 1/2015 | Nitta et al. |
| 2016/0129425 A1 | 5/2016 | Minami |
| 2017/0274357 A1 | 9/2017 | Izumi |
| 2017/0304808 A1 | 10/2017 | Izumi et al. |
| 2018/0057407 A1 | 3/2018 | Izumi |

FOREIGN PATENT DOCUMENTS

| | | |
|---|---|---|
| JP | 2014-121686 A1 | 7/2014 |
| JP | 2016-087587 A1 | 5/2016 |
| JP | 2017-171543 A1 | 9/2017 |
| JP | 2017-186220 A1 | 10/2017 |
| JP | 2018-030105 A1 | 3/2018 |
| JP | 2018-043177 A1 | 3/2018 |
| WO | 2013/108424 A1 | 7/2013 |

OTHER PUBLICATIONS

English translation of the International Preliminary Report on Patentability (Chapter I) dated Jul. 29, 2021 (Application No. PCT/JP2020/000680).

\* cited by examiner

POROUS CERAMIC STRUCTURE

CROSS-REFERENCE TO RELATED APPLICATION

This present application is a continuation application of International Application No. PCT/JP2020/000680, filed on Jan. 10, 2020, which claims priority to Japanese Patent Application No. 2019-007709, filed Jan. 21, 2019. The contents of these application are incorporated herein by reference in their entirety.

TECHNICAL FIELD

The present invention relates to a porous ceramic structure.

BACKGROUND ART

Japanese Patent Application Laid-Open No. 2017-186220 (Document 1) proposes cerium dioxide particles that contain therein or thereon a transition-metal oxide containing iron and manganese. It is assumed that such cerium dioxide particles are, for example, used as an oxidation catalyst in a diesel particulate filter (DPF) that includes a diesel oxidation catalyst (DOC) and a catalyzed soot filter (CSF).

Japanese Patent Application Laid-Open Nos. 2018-30105 (Document 2) and 2017-171543 (Document 3) propose techniques that allow a sufficient amount of a catalyst to be supported in porous ceramic structures used in DPFs or other measures in order to maintain a catalytic activity. In the porous ceramic structures, portions of cerium dioxide particles are taken into the structures and the other portions of the cerium dioxide particles are exposed to the surfaces of pores in the structures. In the porous ceramic structure according to Document 2, the portions of the cerium dioxide particles that are exposed to the surfaces of the pores contain an iron oxide. In the porous ceramic structure according to Document 3, the portions of the cerium dioxide particles that are exposed to the surfaces of the pores support fine catalyst particles of an element of the platinum group.

The porous ceramic structures used in DPFs or other measures are required to achieve both a reduction in pressure loss and an improvement in catalytic performance.

SUMMARY OF INVENTION

The present invention is intended for a porous ceramic structure, and it is an object of the present invention to provide a porous ceramic structure with low pressure loss and high catalytic performance.

A porous ceramic structure according to a preferable embodiment of the present invention includes a porous structure body composed primarily of cordierite, cerium-containing particles fixedly attached to the structure body, and metal oxide particles containing at least one of iron, manganese, and cobalt and each fixedly attached to an inside of a pore of the structure body. The metal oxide particles have a fixedly attached portion located within the structure body, and a protrusion contiguous with the fixedly attached portion and protruding into the pore. When the porous ceramic structure contains iron, an iron content in the porous ceramic structure is higher than or equal to 0.1 mass % and lower than or equal to 3.0 mass % in terms of $Fe_2O_3$. When the porous ceramic structure contains manganese, a manganese content in the porous ceramic structure is higher than or equal to 0.1 mass % and lower than or equal to 3.0 mass % in terms of $Mn_2O_3$. When the porous ceramic structure contains cobalt together with iron or manganese, a cobalt content in the porous ceramic structure is higher than or equal to 0.1 mass % and lower than or equal to 3.0 mass % in terms of $Co_3O_4$. When the porous ceramic structure contains cobalt without containing iron and manganese, the cobalt content in the porous ceramic structure is higher than or equal to 0.2 mass % and lower than or equal to 6.0 mass % in terms of $Co_3O_4$. A cerium content in the porous ceramic structure is higher than or equal to 0.1 mass % and lower than or equal to 10 mass % in terms of $CeO_2$. A ratio of a sum of the iron content in terms of $Fe_2O_3$, the manganese content in terms of $Mn_2O_3$, and the cobalt content in terms of $Co_3O_4$ to the cerium content in terms of $CeO_2$ is higher than or equal to 0.8 and lower than or equal to 9.5. According to the present invention, it is possible to provide a porous ceramic structure with low pressure loss and high catalytic performance.

In other words, a porous ceramic structure according to one preferable embodiment of the present invention includes a porous structure body composed primarily of cordierite, cerium-containing particles fixedly attached to the structure body, and metal oxide particles containing at least iron or manganese among iron, manganese, and cobalt and each fixedly attached to the inside of a pore of the structure body. The metal oxide particles have a fixedly attached portion located within the structure body and a protrusion contiguous with the fixedly attached portion and protruding into a pore. When the porous ceramic structure contains iron, the iron content in the structure is higher than or equal to 0.1 mass % and lower than or equal to 3.0 mass % in terms of $Fe_2O_3$. When the porous ceramic structure contains manganese, the manganese content in the structure is higher than or equal to 0.1 mass % and lower than or equal to 3.0 mass % in terms of $Mn_2O_3$. When the porous ceramic structure contains cobalt, the cobalt content in the structure is higher than or equal to 0.1 mass % and lower than or equal to 3.0 mass % in terms of $Co_3O_4$. The cerium content in the porous ceramic structure is higher than or equal to 0.1 mass % and lower than or equal to 10 mass % in terms of $CeO_2$. The ratio of the sum of the iron content in terms of $Fe_2O_3$, the manganese content in terms of $Mn_2O_3$, and the cobalt content in terms of $Co_3O_4$ to the cerium content in terms of $CeO_2$ is higher than or equal to 0.8 and lower than or equal to 9.5.

Alternatively, a porous ceramic structure according to one preferable embodiment of the present invention includes a porous structure body composed primarily of cordierite, cerium-containing particles fixedly attached to the structure body, and metal oxide particles containing cobalt without containing iron and manganese and each fixedly attached to the inside of a pore of the structure body. The metal oxide particles have a fixedly attached portion located within the structure body, and a protrusion contiguous with the fixedly attached portion and protruding into a pore. In the porous ceramic structure, the cobalt content is higher than or equal to 0.2 mass % and lower than or equal to 6.0 mass % in terms of $Co_3O_4$, and the cerium content is higher than or equal to 0.1 mass % and lower than or equal to 10 mass % in terms of $CeO_2$. The ratio of the cobalt content in terms of $Co_3O_4$ to the cerium content in terms of $CeO_2$ is higher than or equal to 0.8 and lower than or equal to 9.5.

Preferably, when the porous ceramic structure contains iron, the iron content in the porous ceramic structure is higher than or equal to 1.5 mass % and lower than or equal to 3.0 mass % in terms of $Fe_2O_3$, When the porous ceramic structure contains manganese, the manganese content in the porous ceramic structure is higher than or equal to 1.5 mass % and lower than or equal to 3.0 mass % in terms of $Mn_2O_3$. When the porous ceramic structure contains cobalt together with iron or manganese, the cobalt content in the porous ceramic structure is higher than or equal to 1.5 mass % and lower than or equal to 3.0 mass % in terms of $Co_3O_4$. When the porous ceramic structure contains cobalt without containing iron and manganese, the cobalt content in the porous ceramic structure is higher than or equal to 3.0 mass % and lower than or equal to 6.0 mass % in terms of $Co_3O_4$. The cerium content in the porous ceramic structure is higher than or equal to 1.5 mass % and lower than or equal to 4.5 mass % in terms of $CeO_2$. The ratio of the sum of the iron content in terms of $Fe_2O_3$, the manganese content in terms of $Mn_2O_3$, and the cobalt content in terms of $Co_3O_4$ to the cerium content in terms of $CeO_2$ is higher than or equal to 1.0 and lower than or equal to 4.0.

Preferably, the metal oxide particles are particles of an oxide having a spinel structure that contains at least one of iron, manganese, and cobalt.

Preferably, the metal oxide particles are particles of an oxide having a spinel structure that contains iron, manganese, and oxygen or particles of an oxide having a spinel structure that contains cobalt and oxygen.

Preferably, a content of the metal oxide particles is higher than or equal to 0.1 mass % and lower than or equal to 5.0 mass %.

Preferably, the metal oxide particles have a mean particle diameter greater than or equal to 10 nm and less than or equal to 1 μm.

These and other objects, features, aspects and advantages of the present invention will become more apparent from the following detailed description of the present invention when taken in conjunction with the accompanying drawings.

DESCRIPTION OF EMBODIMENTS

Figure 1:
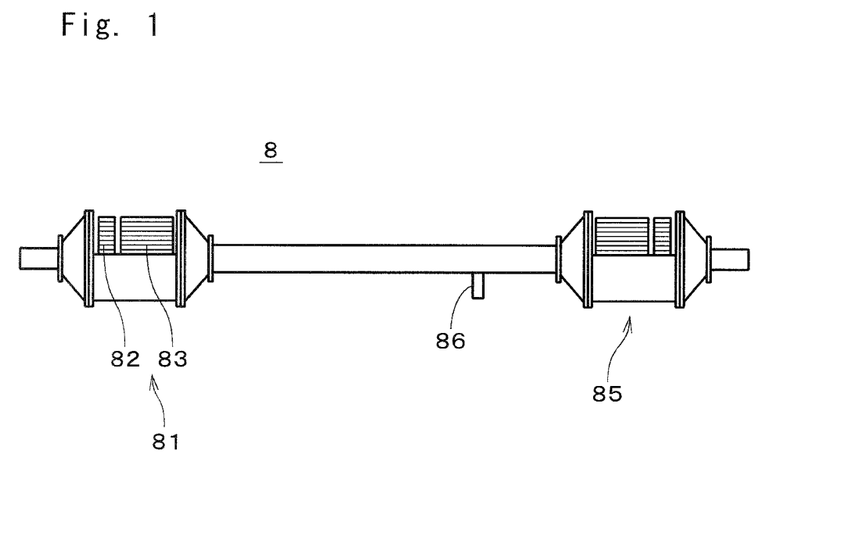
FIG. 1 illustrates a configuration of an exhaust gas purification system.

FIG. 1 illustrates a configuration of an exhaust gas purification system 8. The exhaust gas purification system 8 is configured to purify an exhaust gas emitted from an engine. The exhaust gas purification system 8 includes a diesel particulate filter (DPF) 81, a selective catalytic reduction (SCR) catalytic converter 85, and an urea injector 86. The DPF 81, the urea injector 86, and the SCR catalytic converter 85 are arranged in this order in the direction of flow of the exhaust gas.

The DPF 81 includes a diesel oxidation catalyst (DOC) 82 and a catalyzed soot filter (CSF) 83. The DOC 82 includes a honeycomb structure whose interior is partitioned into a plurality of cells by a partition wall, and a precious-metal oxidation catalyst supported by the partition wall. The CSF 83 includes a honeycomb structure similar to that described above and a metal oxidation catalyst supported by a partition wall of the honeycomb structure. The structure of the CSF 83 will be described later in detail. The urea injector 86 is provided in a path of the exhaust gas between the DPF 81 and the SCR catalytic converter 85. The SCR catalytic converter 85 includes a honeycomb structure similar to that described above and an SCR catalyst supported by a partition wall of the honeycomb structure.

The exhaust gas emitted from the engine flows into the DOC 82 of the DPF 81. The exhaust gas contains nitrogen monoxide (NO), oxygen ($O_2$), and nitrogen ($N_2$) and undergoes reactions expressed by Equations 1 and 2 below in the DOC 82. The reaction expressed by Equation 1 generates nitrogen dioxide ($NO_2$). In Equation 2 below, SOF is a soluble organic fraction contained in particulate matter (PM) in the exhaust gas.

$$2NO + O_2 = 2NO_2 \tag{1}$$

$$SOF + O_2 = CO, CO_2, H_2O \tag{2}$$

The CSF 83 collects carbon (soot) contained in the exhaust gas. In the CSF 83, the soot and $NO_2$ undergo reactions (combustion reactions) expressed by Equations 3, 4, and 5 below, so that NO is generated from $NO_2$.

$$C\ (soot) + 2NO_2 = CO_2 + 2NO \tag{3}$$

$$C\ (soot) + NO_2 = CO + NO \tag{4}$$

$$C\ (soot) + 1/2O_2 + NO_2 = CO_2 + NO \tag{5}$$

The urea injector 86 mixes urea into the exhaust gas emitted from the CSF 83, and the exhaust gas that contains ammonia ($NH_3$) generated by decomposition of the urea flows into the SCR catalytic converter 85. In the SCR catalytic converter 85, reactions expressed by Equations 6, 7, and 8 below occur, so that $NO_x$ contained in the exhaust gas is purified.

$$4NO + 4NH_3 + O_2 = 4N_2 + 6H_2O \tag{6}$$

$$NO + NO_2 + 2NH_3 = 2N_2 + 3H_2O \tag{7}$$

$$6NO_2 + 8NH_3 = 7N_2 + 12H_2O \tag{8}$$

The reaction expressed by Equation 7 is called a Fast SCR reaction and proceeds at a higher reaction rate than the reactions expressed by Equations 6 and 8. In order to improve the efficiency of the reactions occurring in the SCR catalytic converter 85 in accordance with Equation 7, the ratio between the amounts of substances of NO and $NO_2$, which flow into the SCR catalytic converter 85, is required to be 1:1. Meanwhile, the CSF 83 consumes a large amount of $NO_2$ in the combustion of soot and generates NO as expressed by Equations 3, 4, and 5 described previously.

In view of this, the exhaust gas purification system 8 according to the present invention includes, as the CSF 83, a porous ceramic structure that includes an oxidation catalyst, which will be described later. The porous ceramic structure oxidizes part of NO to generate $NO_2$, i.e., converts NO into $NO_2$. This allows the ratio between the amounts of substances of NO and $NO_2$, which flow into the SCR catalytic converter 85, to become closer to 1:1 and improves the efficiency of the reactions occurring in the SCR catalytic converter 85.

In the case where a certain amount or more of soot is deposited on the CSF 83, the exhaust gas purification system 8 performs processing for burning the soot (i.e., regeneration). In this case as well, the reactions (combustion reactions) expressed by Equations 3, 4, and 5 occur in the CSF 83. If the carbon monoxide (CO) generated by the reactions flows in large amounts into the SCR catalytic converter 85, the $NO_x$ purification efficiency of the SCR catalytic converter 85 may decline. The same applies to the case where hydrocarbon (HC) contained in the fuel supplied to the CSF 83 flows in large amounts into the SCR catalytic converter 85 during the processing for burning the soot.

In the exhaust gas purification system 8 according to the present invention, since the porous ceramic structure including the aforementioned oxidation catalyst is provided as the CSF 83, part of CO is oxidized into carbon dioxide ($CO_2$), and part of HC is oxidized into $CO_2$ and $H_2O$. This suppresses the flow of CO, HC, and other substances into the SCR catalytic converter 85 and suppresses a decline in the $NO_x$ purification efficiency of the SCR catalytic converter 85.

Figure 2:
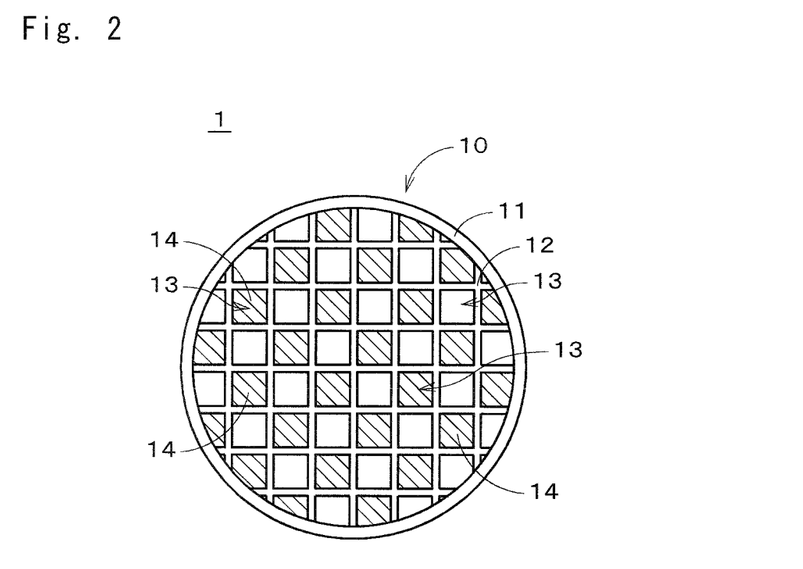
FIG. 2 illustrates a porous ceramic structure.
Figure 3:
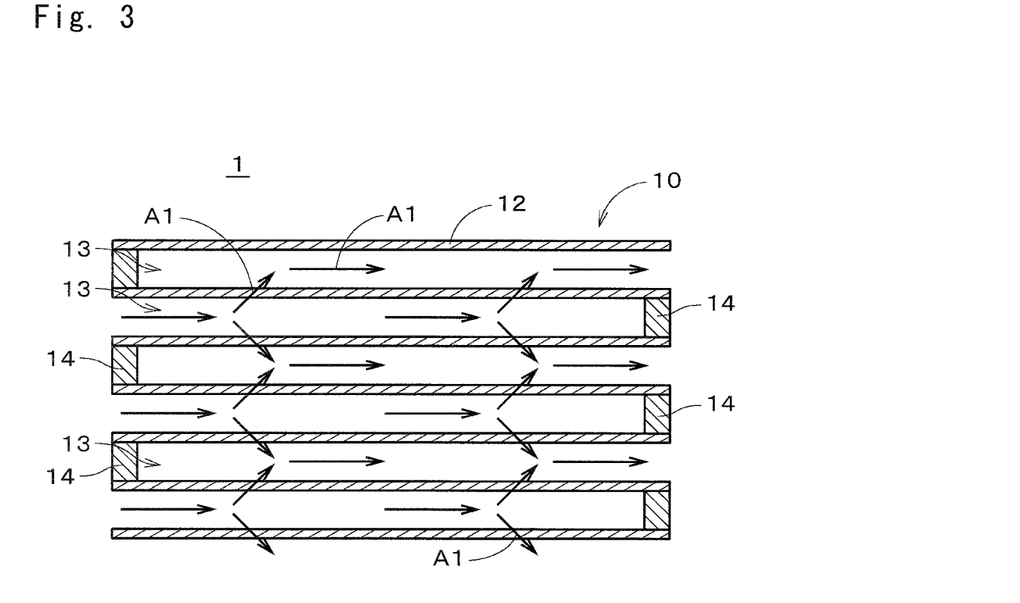
FIG. 3 is a sectional view of the porous ceramic structure.

FIGS. 2 and 3 are simplified diagrams of a porous ceramic structure 1. The porous ceramic structure 1 is a tubular member that is long in one direction, and FIG. 2 illustrates the end face on one side of the porous ceramic structure 1 in the longitudinal direction. FIG. 3 is a sectional view of the porous ceramic structure 1 and illustrates part of a section taken along the longitudinal direction of the porous ceramic structure 1.

The porous ceramic structure 1 includes a honeycomb structure 10 serving as a porous structure body, cerium-containing particles, and metal oxide particles serving as an oxidation catalyst. The honeycomb structure 10 includes a tubular outer wall 11 and a partition wall 12. The tubular outer wall 11 has a tubular shape extending in the longitudinal direction. A cross-sectional shape of the tubular outer wall 11 that is perpendicular to the longitudinal direction may, for example, be circular, or may be polygonal or any other shape. The partition wall 12 is provided in the interior of the tubular outer wall 11 and partitions the interior into a plurality of cells 13. The honeycomb structure 10 is a cell structure whose interior is partitioned into the plurality of cells 13 by the partition wall 12. The tubular outer wall 11 and the partition wall 12 are made of a porous material. As will be described later, the exhaust gas passes through pores of the partition wall 12. In order to increase the strength of the porous ceramic structure 1, the thickness of the partition wall 12 is, for example, greater than or equal to 50 micrometers (µm), preferably greater than or equal to 100 µm, and more preferably greater than or equal to 150 µm. In order to reduce pressure loss in the partition wall 12, the thickness of the partition wall 12 is, for example, less than or equal to 500 µm and preferably less than or equal to 450 µm.

Each cell 13 is a space extending in the longitudinal direction. Cross-sectional shapes of the cells 13 that are perpendicular to the longitudinal direction may, for example, be polygonal (e.g., triangular, quadrangular, pentagonal, or hexagonal), or may be circular or any other shape. The cells 13 typically have the same cross-sectional shape. Alternatively, the cells 13 may include cells 13 that have different cross-sectional shapes. In order to improve oxidation performance of the porous ceramic structure 1, the density of the cells (cell density) is, for example, higher than or equal to 8 cells per square centimeters (cells/$cm^2$) and preferably higher than or equal to 15 cells/$cm^2$. In order to reduce pressure loss, the cell density is, for example, lower than or equal to 95 cells/$cm^2$ and preferably lower than or equal to 78 cells/$cm^2$.

In the porous ceramic structure 1 used as the CSF 83, the exhaust gas from the DOC 82 flows, using one end in the longitudinal direction of the honeycomb structure 10 as an inlet and the other end thereof as an outlet. A predetermined number of cells 13 are each provided with a sealer 14 at its end on the inlet side, and the remaining cells 13 are each provided with a sealer 14 at its end on the outlet side. Therefore, the exhaust gas that flows into the honeycomb structure 10 flows from the cells 13 having inlets that are not sealed through the partition wall 12 to the cells 13 having outlets that are not sealed (see arrows A1 in FIG. 3). At this time, the exhaust gas is oxidized by the metal oxide particles (i.e., oxidation catalyst) on the partition wall 12. At each of the inlet- and outlet-side ends of the honeycomb structure 10, it is preferable that the sealers 14 are alternately provided in the direction of arrangement of the cells 13.

The honeycomb structure 10 is composed primarily of cordierite. The honeycomb structure 10 may be composed of only cordierite, or may contain materials other than cordierite (e.g., metal or ceramic other than cordierite). The cordierite content in the honeycomb structure 10 is, for example, higher than or equal to 75 mass % and preferably higher than or equal to 80 mass %. In the present embodiment, the honeycomb structure 10 is substantially composed of only cordierite.

Figure 4:
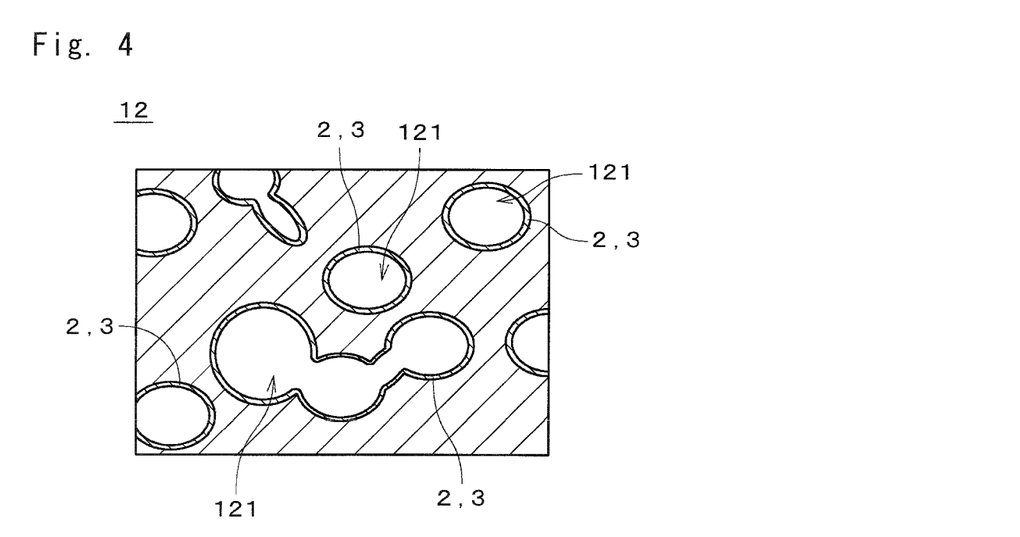
FIG. 4 is an enlarged view of part of a partition wall.

FIG. 4 is an enlarged view of part of the partition wall 12 in the porous ceramic structure 1. The honeycomb structure 10 has a large number of gas cavities (hereinafter, also referred to as "pores 121"). The metal oxide particles 2 and the cerium-containing particles 3 described above are fixedly attached to the insides of the pores 121. FIG. 4 schematically illustrates the metal oxide particles 2 and the cerium-containing particles 3 on the surfaces of the pores 121 by cross hatching without distinguishing between them. Note that the metal oxide particles 2 and the cerium-containing particles 3 do not necessarily have to cover the entire surfaces of the pores 121.

In order to reduce pressure loss in the porous ceramic structure 1, the open porosity of the partition wall 12 in the honeycomb structure 10 is, for example, higher than or equal to 25%, preferably higher than or equal to 30%, and more preferably higher than or equal to 35%. From the viewpoint of ensuring the strength of the porous ceramic structure 1, the open porosity of the partition wall 12 is, for example, lower than or equal to 70% and preferably lower than or equal to 65%. The open porosity can be measured by, for example, the Archimedes method using deionized water as a medium.

The mean pore diameter of the partition wall 12 in the honeycomb structure 10 is, for example, greater than or equal to 5 µm and preferably greater than or equal to 8 µm. Like the open porosity, as the mean pore diameter of the partition wall 12 increases, pressure loss in the porous ceramic structure 1 decreases. In order to improve the oxidation performance of the porous ceramic structure 1, the mean pore diameter in the honeycomb structure 10 is, for example, less than or equal to 40 µm, preferably less than or equal to 30 µm, and more preferably less than or equal to 25

μm. The mean pore diameter can be measured by, for example, mercury intrusion porosimetry (in accordance with JIS R1655). Depending on the design of the porous ceramic structure 1, the sealers 14 may be omitted, and the metal oxide particles 2 may be held in a layer on the surfaces of the cells 13.

Figure 5:
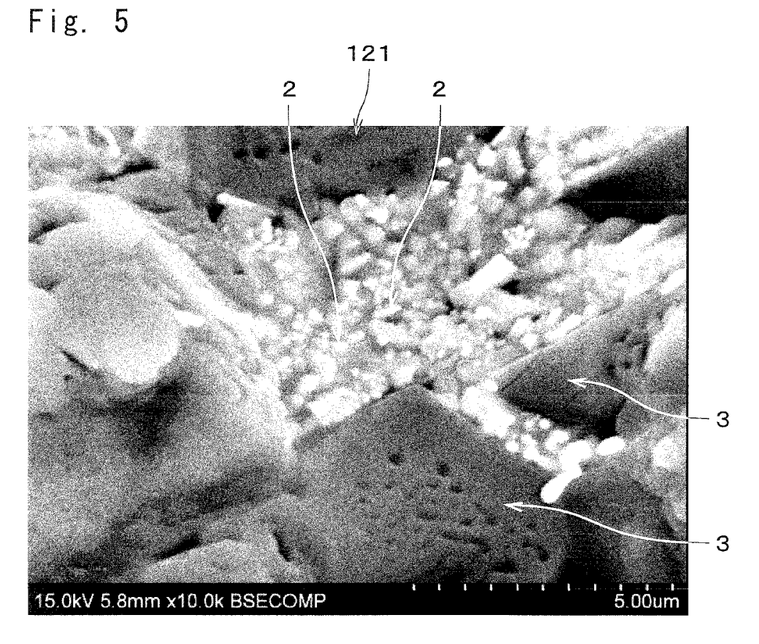
FIG. 5 shows an SEM image of the surface of a pore in the honeycomb structure.

FIG. 5 shows a scanning electron microscope (SEM) image of the surface of a pore 121 in the honeycomb structure 10. In FIG. 5, a large number of metal oxide particles 2 having relatively small particle diameters and a large number of cerium-containing particles 3 having larger particle diameters than the metal oxide particles 2 are fixedly attached to the surface of the pore 121. The mean particle diameter of the metal oxide particles 2 is, for example, greater than or equal to 10 nm. The particle diameters of the metal oxide particles 2 are, for example, less than or equal to 1 μm, preferably less than or equal to 100 nm, and more preferably less than or equal to 60 nm. The mean particle diameter of the cerium-containing particles 3 is greater than the mean particle diameter of the metal oxide particles 2. The mean particle diameter of the cerium-containing particles 3 is, for example, greater than or equal to 0.5 μm, preferably greater than or equal to 1 μm, and more preferably greater than or equal to 2 μm. The particle diameters of the cerium-containing particles 3 are, for example, less than or equal to 30 μm, preferably less than or equal to 20 μm, and more preferably less than or equal to 10 μm.

The mean particle diameter of the metal oxide particles 2 is obtained by, for example, calculating an average value of the particle diameters of the metal oxide particles 2 in an image of the metal oxide particles 2, captured at a predetermined magnification by an SEM. The same applies to the mean particle diameter of the cerium-containing particles 3. Alternatively, the mean particle diameters of the metal oxide particles 2 and the cerium-containing particles 3 may be obtained by laser diffractometry.

The metal oxide particles 2 are fine particles that contain at least one of iron (Fe), manganese (Mn), and cobalt (Co) elements. For example, the metal oxide particles 2 are composed of only an oxide that contains one or more of Fe, Mn, and Co. Preferably, the metal oxide particles 2 are particles of an oxide having a spinel structure (i.e., spinel crystal structure) that contains at least one of Fe, Mn, and Co. More preferably, the metal oxide particles 2 are particles of an oxide having a spinel structure that contains Fe, Mn, and oxygen (O) ($Fe_xMn_yO_4$, where x and y are positive numerical values that satisfy x+y=3), or particles of an oxide ($Co_3O_4$) having a spinel structure that contains Co and oxygen (O). The cerium-containing particles 3 are fine particles containing cerium (Ce) elements. For example, the cerium-containing particles 3 are cerium dioxide ($CeO_2$) particles.

When the porous ceramic structure 1 contains Fe, the Fe content in the porous ceramic structure 1 is higher than or equal to 0.1 mass % and preferably higher than or equal to 1.5 mass % in terms of $Fe_2O_3$. The Fe content is also lower than or equal to 3.0 mass % in terms of $Fe_2O_3$. The Fe content in terms of $Fe_2O_3$ as used herein refers to the percentage of a value obtained by dividing the weight of $Fe_2O_3$ by the weight of the porous ceramic structure 1 in the case where it is assumed that all Fe components contained in the porous ceramic structure 1 exist as $Fe_2O_3$.

When the porous ceramic structure 1 contains Mn, the Mn content in the porous ceramic structure 1 is higher than or equal to 0.1 mass % and preferably higher than or equal to 1.5 mass % in terms of $Mn_2O_3$. The Mn content is also lower than or equal to 3.0 mass % in terms of $Mn_2O_3$. The Mn content in terms of $Mn_2O_3$ as used herein refers to the percentage of a value obtained by dividing the weight of $Mn_2O_3$ by the weight of the porous ceramic structure 1 in the case where it is assumed that all Mn components contained in the porous ceramic structure 1 exist as $Mn_2O_3$.

When the porous ceramic structure 1 contains Co, the Co content in the porous ceramic structure 1 is as described below. When porous ceramic structure 1 contains Co together with Fe or Mn (i.e., the porous ceramic structure 1 contains Co and at least one of Fe and Mn), the Co content in the porous ceramic structure 1 is higher than or equal to 0.1 mass % and preferably higher than or equal to 1.5 mass % in terms of $Co_3O_4$. The Co content is also lower than or equal to 3.0 mass % in terms of $Co_3O_4$.

On the other hand, when the porous ceramic structure 1 contains Co without containing Fe and Mn, the Co content in the porous ceramic structure 1 is higher than or equal to 0.2 mass % and preferably higher than or equal to 3.0 mass % in terms of $Co_3O_4$. The Co content is also lower than or equal to 6.0 mass % in terms of $Co_3O_4$. The Co content in terms of $Co_3O_4$ as used herein refers to the percentage of a value obtained by dividing the weight of $Co_3O_4$ by the weight of the porous ceramic structure 1 in the case where it is assumed that all Co components contained in the porous ceramic structure 1 exist as $Co_3O_4$.

The Ce content in the porous ceramic structure 1 is higher than or equal to 0.1 mass % and preferably higher than or equal to 1.5 mass % in terms of $CeO_2$. The Ce content is also lower than or equal to 10 mass % and preferably lower than or equal to 4.5 mass % in terms of $CeO_2$. The Ce content in terms of $CeO_2$ as used herein refers to the percentage of a value obtained by dividing the weight of $CeO_2$ by the weight of the porous ceramic structure 1 in the case where it is assumed that all Ce components contained in the porous ceramic structure 1 exist as $CeO_2$.

The ratio of the sum of the Fe content in terms of $Fe_2O_3$, the Mn content in terms of $Mn_2O_3$, and the Co content in terms of $Co_3O_4$ to the Ce content in terms of $CeO_2$ (i.e., value obtained by dividing a total of the Fe content in terms of $Fe_2O_3$, the Mn content in terms of $Mn_2O_3$, and the Co content in terms of $Co_3O_4$ by the Ce content in terms of $CeO_2$) is higher than or equal to 0.8 and preferably higher than or equal to 1.0. The ratio is also lower than or equal to 9.5 and preferably lower than or equal to 4.0. In the following description, this ratio is referred to as the "Fe/Mn/Co ratio."

In order for the porous ceramic structure 1 to achieve high catalytic performance with the metal oxide particles 2, the content of the metal oxide particles 2 in the porous ceramic structure 1 is, for example, higher than or equal to 0.1 mass %. In order to reduce pressure loss in the porous ceramic structure 1, the content of the metal oxide particles 2 in the porous ceramic structure 1 is, for example, lower than or equal to 5.0 mass %.

In other words, the amount of the metal oxide particles 2 supported in the porous ceramic structure 1 is, for example, greater than or equal to 3 grams per liter (g/L), preferably greater than or equal to 5 g/L, and more preferably greater than or equal to 8 g/L. The amount of the metal oxide particles 2 supported in the porous ceramic structure 1 is also, for example, less than or equal to 50 g/L, preferably less than or equal to 45 g/L, and more preferably less than or equal to 40 g/L. The amount (g/L) of the metal oxide particles 2 supported indicates the amount (g) of the metal oxide particles 2 supported per unit volume (L) in the honeycomb structure 10.

Figure 6:
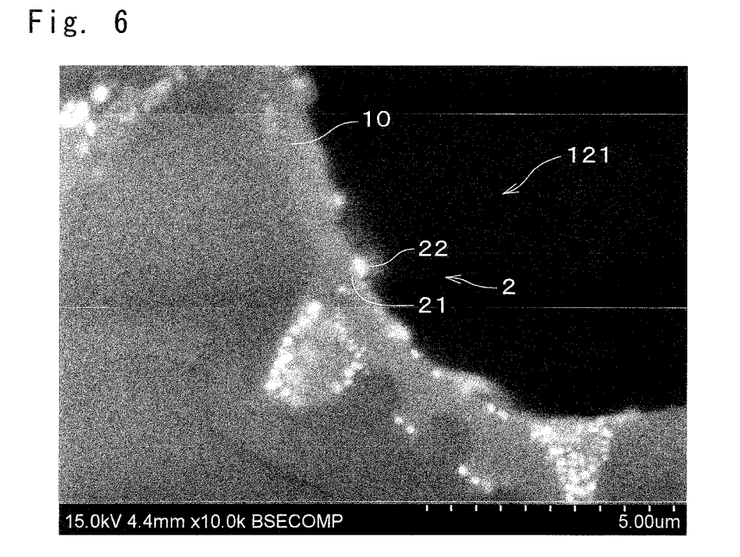
FIG. 6 shows an enlarged SEM image of metal oxide particles on the surface of a pore.
Figure 7:
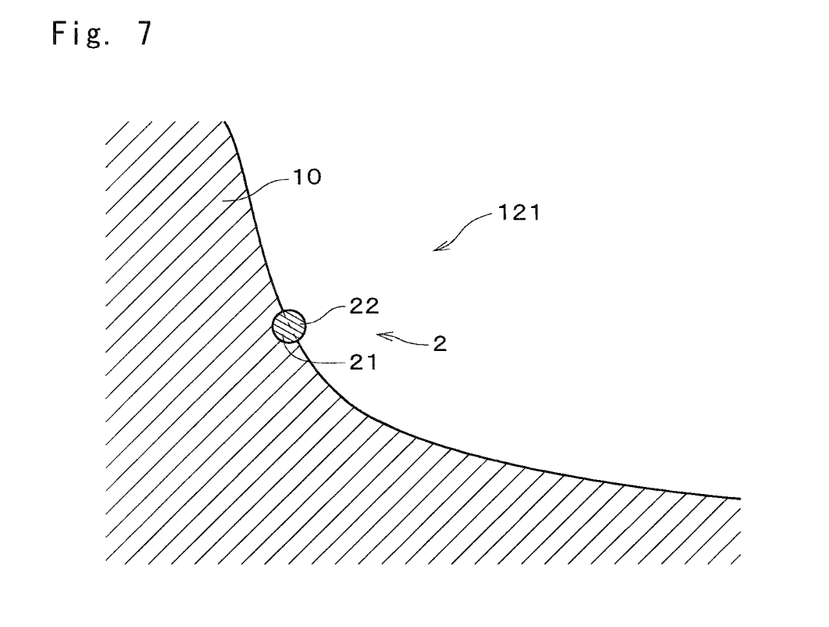
FIG. 7 is a sectional view of an area in the vicinity of a metal oxide particle.

FIG. 6 shows an enlarged SEM image of the metal oxide particles 2 on the surface of a pore 121. As shown in FIG. 6, the metal oxide particles 2 have forms that protrude partly from the inside of the honeycomb structure 10 into a pore 121. FIG. 7 is a sectional view of an area in the vicinity of a metal oxide particle 2 in FIG. 6.

The metal oxide particle 2 has a fixedly attached portion 21 and a protrusion 22. The fixedly attached portion 21 is located within the honeycomb structure 10. The term "within the honeycomb structure 10" refers to within the cordierite surrounding the pore 121 and does not refer to within the pore 121 provided in the honeycomb structure 10. The fixedly attached portion 21 is a bonding portion of the metal oxide particle 2 that is bonded to the cordierite serving as the principal component of the honeycomb structure 10 and that is fixedly attached to the inside of the cordierite. In other words, the fixedly attached portion 21 is a portion of the metal oxide particle 2 that crawls into the cordierite from the surface of the pore 121 to the side opposite to the pore 121 in the honeycomb structure 10. In yet other words, the fixedly attached portion 21 is a portion of the metal oxide particle 2 whose surface is covered with the cordierite.

The protrusion 22 is a portion of the metal oxide particle 2 that protrudes from the surface of the pore 121 into the pore 121. In other words, the protrusion 22 is a portion that is exposed from the surface of the cordierite. The protrusion 22 is contiguous with the fixedly attached portion 21.

In the porous ceramic structure 1, the honeycomb structure 10 does not undergo a coating process using γ-alumina or the like (so-called wash coating). Therefore, a coating that is supposed to be formed by the aforementioned coating process is not formed on the surfaces of the pores 121 and, as a natural result, such a coating does not intervene between the metal oxide particles 2 and the honeycomb structure 10 that are fixedly attached.

Among a large number of metal oxide particles 2 contained in the porous ceramic structure 1, some metal oxide particles 2 are fixedly attached to the surfaces of the pores 121 inside the pores 121 as described above, and the other metal oxide particles 2 are located in their entirety within the honeycomb structure 10. The same applies to the cerium-containing particles 3.

Figure 8:
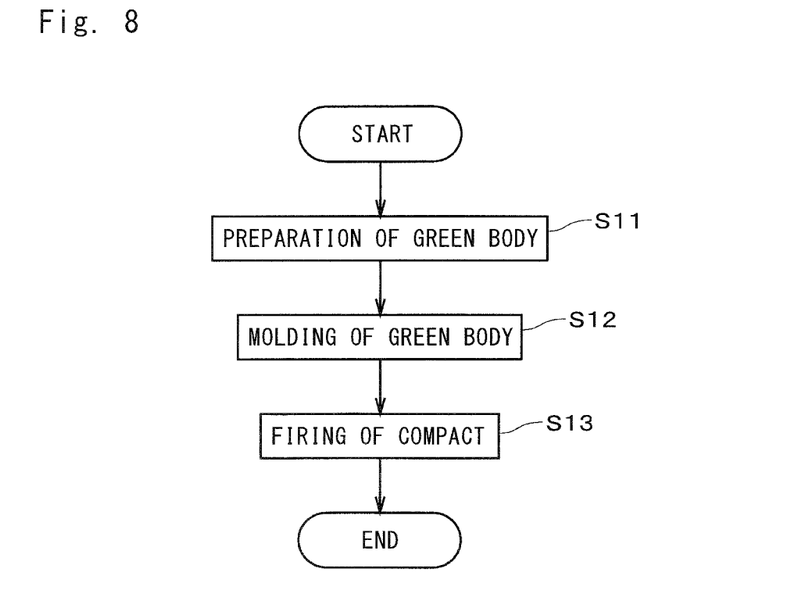
FIG. 8 is a flowchart of the method of producing the porous ceramic structure.

Next, an example of the method of producing the porous ceramic structure 1 will be described with reference to FIG. 8. In the production of the porous ceramic structure 1, a structure raw material is first prepared by weighing and mixing a material for the honeycomb structure 10, a material for the cerium-containing particles 3 (e.g., $CeO_2$), and a material for the metal oxide particles 2 (e.g., $Fe_2O_3$ and $Mn_2O_3$, or $Co_3O_4$). The principal component of the material for the honeycomb structure 10 is cordierite that serves as an aggregate of the honeycomb structure 10. The material for the honeycomb structure 10 also includes other components such as a bore forming material and a binder. After the structure raw material is subjected to dry mixing in a kneader, water is added so that the structure raw material is further kneaded into a green body in the kneader (step S11).

The times required for the above dry mixing and kneading are respectively 15 minutes and 30 minutes, for example. The dry mixing time and the kneading time may be modified in various ways. The aforementioned raw material for the cerium-containing particles 3 may be salts such as cerium nitrate. The aforementioned raw material for the metal oxide particles 2 may be salts such as iron nitrate, manganese nitrate, or cobalt nitrate.

In step S11, the raw material for the cerium-containing particles 3 and the raw material for the metal oxide particles 2 are individually added to the aggregate or the like of the honeycomb structure 10, but the method of adding these raw materials may be modified in various ways. For example, the raw material for the metal oxide particles 2 may be immersed in $CeO_2$ and dried and fired to generate additives, and these additives may be added to the aggregate or the like of the honeycomb structure 10. In the additives, part of the raw material for the metal oxide particles 2 is solid-dissolved in $CeO_2$ or adheres to $CeO_2$.

The green body prepared in step S11 is molded into a column-like shape by a vacuum kneading machine or other machines and then subjected to extrusion molding to form a honeycomb compact of a honeycomb shape by an extruder (step S12). This honeycomb compact includes therein a grid-like partition wall that sections the honeycomb compact into a plurality of cells serving as flow paths for a fluid. The honeycomb compact has a honeycomb diameter of 30 mm, a partition wall thickness of 12 mil (approximately 0.3 mm), a cell density of 300 cells per square inch (cps), i.e., 46.5 cells/cm$^2$, and an outer wall thickness of approximately 0.6 mm. Alternatively, in step S12 the honeycomb compact may be molded by a molding method other than extrusion molding.

The honeycomb compact prepared in step S12 is subjected to microwave drying so as to transpire approximately 70% of moisture, and is then subjected to hot air drying (80° C.×12 hours). Then, the honeycomb compact is put into a degreasing furnace maintained at 450° C. so as to remove (i.e., degrease) organic components remaining in the honeycomb compact. Thereafter, the honeycomb compact is subjected to a firing process (firing), so as to obtain the porous ceramic structure 1 that includes the honeycomb structure 10, the cerium-containing particles 3, and the metal oxide particles 2 (step S13). The firing process in step S13 is conducted at a firing temperature of 1300° C. to 1500° C. for eight hours under atmospheric pressure. The firing temperature is preferably higher than or equal to 1350° C. and more preferably higher than or equal to 1370° C. The firing temperature is also preferably lower than or equal to 1450° C. and more preferably lower than or equal to 1430° C. Conditions for the firing process may be appropriately modified. The porous ceramic structure 1 produced by the above production method does not contain precious metals, and therefore can be produced at low cost.

Next, Examples 1 to 16 and Comparative Examples 1 to 6 will be described with reference to Tables 1 to 3, these examples showing the relationship of the content of the metal oxide particles 2 in the porous ceramic structure 1, pressure loss, and catalytic performance. The Fe/Mn/Co ratio in the tables was obtained by dividing the total of the $Fe_2O_3$ content (mass %), the $Mn_2O_3$ content (mass %), and the Co content (mass %) in terms of $Co_3O_4$ by the $CeO_2$ content (mass %) in the composition of the material for the porous ceramic structure 1.

The composition of the crystalline phase in the porous ceramic structure 1 (i.e., mass ratio of components) was identified and quantitated as follows. Measurements of the crystalline phase of each particle were conducted on produced samples, using an X-ray diffractometer (rotary anti-cathode X-ray diffractometer: RINT 2500 by Rigaku Corporation). Conditions for the X-ray diffractometry were set to a CuKα-ray source, 50 kV, 300 mA, and 2θ of 10° to 60°, and resultant X-ray diffraction data was analyzed using commercial X-ray data analysis software. In the crystalline phase, $Fe_xMn_yO_4$ was a spinel oxide composed of Fe and Mn. In $Fe_xMn_yO_4$, x and y were positive numerical values satisfying x+y=3. A mean particle diameter of $Fe_xMn_yO_4$, where x and y were positive numerical values satisfying x+y=3, was assumed to be the diameter of crystallites. The diameter of crystallites was based on the data obtained by the aforementioned X-ray diffractometry using the X-ray diffractometer, and was calculated by applying this data to the Scherrer equation ($\tau=K\lambda/\beta \cos \theta$), where $\tau$ was the average size of crystallites, K was the form factor (factor forming a relationship between the sizes of crystallites contained in a solid and the peak width of a diffraction pattern), $\lambda$ was the X-ray wavelength, $\beta$ was the full width at peak (in units of radians), and $\theta$ was the Bragg angle. In the crystalline phase, $Co_3O_4$ was a spinel oxide composed of Co. A mean particle diameter of $Co_3O_4$ was obtained in a similar manner to the aforementioned mean particle diameter of $Fe_xMn_yO_4$. A mean particle diameter of $CeO_2$ was also obtained in a similar manner. The open porosity in the porous ceramic structure 1 was measured by the Archimedes method using deionized water as a medium. As described previously, pressure loss in the porous ceramic structure 1 decrease as the open porosity increases.

The NO adsorption in the porous ceramic structure 1 was obtained as follows. First, an adsorption test was conducted by supplying an NO-containing introduction gas into samples equivalent to the porous ceramic structure 1. The introduction gas was a mixed gas that contained 200 volume (ppm) of NO and 10 volume (%) of oxygen ($O_2$), using helium (He) as a balance gas. The adsorption test was conducted at 250° C. for 60 minutes. After the adsorption test was completed, the samples were subjected to temperature-programmed desorption in He, and resultant derived gases were partly sampled. The sampled derived gases were then analyzed with a mass spectrometer (GSD 320 produced by Pfeiffer Vacuum) so as to obtain the amounts of NO adsorbed in the samples. In general, there is tendency that the porous ceramic structure 1 has higher catalytic performance as the NO adsorption increases.

The NO oxidation temperature in the porous ceramic structure 1 was obtained as follows. First, the relationship between the temperature and the $NO_2$ conversion rate of the porous ceramic structure 1 was obtained. The $NO_2$ conversion rate was the ratio of NO converted into $NO_2$ in an NO-containing derived gas that had been supplied to the porous ceramic structure 1 at a space velocity (SV) of 24400 $h^{-1}$ and passed through the porous ceramic structure 1. The introduction gas contained 100 ppm of NO, 1500 ppm of CO, 5% of $CO_2$, 450 ppm of propane ($C_3H_6$), and 2% of $H_2O$. The analysis of the derived gas was conducted by Fourier transform infrared spectroscopy (FT-IR). The $NO_2$ conversion rate was approximately 0% at low temperatures, gradually increased to a maximum value with a rise in temperature, and then gradually decreased from the maximum value. The porous ceramic structure 1 achieves higher catalytic performance as the $NO_2$ conversion rate is higher. When the relationship between the $NO_2$ conversion rate and the temperature was obtained, a temperature at which the $NO_2$ conversion rate became one half of the maximum value with a temperature rose from the low temperature side in accordance with the above relationship was obtained as the NO oxidation temperature. The porous ceramic structure 1 achieves higher catalytic performance as the NO oxidation temperature is lower.

TABLE 1

| | Material Composition (mass %) | | | | | | | | Fe/Mn/Co |
| | MgO | $Al_2O_3$ | $SiO_2$ | $Fe_2O_3$ | $Mn_2O_3$ | $Co_3O_4$ | $CeO_2$ | Total | Ratio |
|---|---|---|---|---|---|---|---|---|---|
| Example 1 | 13.9 | 34.1 | 50.9 | 0.3 | 0.3 | 0.0 | 0.5 | 100 | 1.0 |
| Exmple 2 | 13.9 | 34.1 | 50.9 | 0.5 | 0.5 | 0.0 | 0.1 | 100 | 9.0 |
| Example 3 | 13.6 | 33.3 | 49.8 | 1.4 | 1.2 | 0.0 | 0.6 | 100 | 4.0 |
| Example 4 | 13.2 | 32.3 | 48.3 | 1.6 | 1.5 | 0.0 | 3.1 | 100 | 1.0 |
| Example 5 | 13.2 | 32.3 | 48.3 | 1.8 | 1.6 | 0.0 | 2.8 | 100 | 1.2 |
| Example 6 | 13.0 | 31.8 | 47.5 | 2.0 | 1.8 | 0.0 | 3.8 | 100 | 1.0 |
| Example 7 | 13.2 | 32.3 | 48.3 | 2.5 | 2.2 | 0.0 | 1.6 | 100 | 3.0 |
| Example 8 | 12.7 | 31.0 | 46.3 | 2.6 | 2.4 | 0.0 | 5.0 | 100 | 1.0 |
| Example 9 | 12.7 | 31.0 | 46.3 | 2.9 | 2.6 | 0.0 | 4.5 | 100 | 1.2 |
| Example 10 | 13.2 | 32.3 | 48.3 | 2.6 | 2.4 | 0.0 | 1.2 | 100 | 4.0 |
| Example 11 | 6.1 | 34.7 | 51.5 | 0.0 | 0.0 | 3.5 | 4.3 | 100 | 0.8 |
| Example 12 | 6.1 | 34.7 | 51.5 | 0.0 | 0.0 | 3.9 | 3.9 | 100 | 1.0 |
| Example 13 | 12.9 | 31.8 | 47.2 | 0.0 | 0.0 | 4.1 | 4.1 | 100 | 1.0 |
| Example 14 | 12.7 | 31.0 | 46.3 | 0.0 | 0.0 | 5.5 | 4.5 | 100 | 1.2 |
| Example 15 | 13.0 | 32.2 | 47.7 | 0.6 | 0.6 | 2.1 | 3.9 | 100 | 0.8 |
| Example 16 | 12.7 | 31.4 | 46.5 | 1.5 | 1.5 | 1.9 | 4.5 | 100 | 1.1 |
| Comparative Example 1 | 13.8 | 34.9 | 51.3 | 0.0 | 0.0 | 0.0 | 0.0 | 100 | — |
| Comparative Example 2 | 14.1 | 34.4 | 51.4 | 0.01 | 0.01 | 0.0 | 0.1 | 100 | 0.2 |
| Comparative Example 3 | 12.7 | 31.0 | 46.3 | 0.9 | 0.8 | 0.0 | 8.3 | 100 | 0.2 |
| Comparative Example 4 | 13.0 | 31.8 | 47.5 | 1.5 | 1.4 | 0.0 | 4.8 | 100 | 0.6 |
| Comparative Example 5 | 13.2 | 32.3 | 48.3 | 3.1 | 3.1 | 0.0 | 0.0 | 100 | — |
| Comparative Example 6 | 13.1 | 32.5 | 48.2 | 0.0 | 0.0 | 1.8 | 4.5 | 100 | 0.4 |

TABLE 2

| | Composition of Crystalline Phase (mass %) | | | | | | | |
|---|---|---|---|---|---|---|---|---|
| | Cordierite | $Fe_xMn_yO_4$ | $Co_3O_4$ | (Fe, Mn)$SiO_3$ | $Co_2SiO_4$ | $CeO_2$ | Others | Total |
| Example 1 | 89.0 | 0.2 | 0.0 | 0.0 | 0.0 | 0.5 | 10.3 | 100 |
| Example 2 | 90.0 | 0.5 | 0.0 | 0.0 | 0.0 | 0.1 | 9.4 | 100 |
| Example 3 | 88.0 | 1.5 | 0.0 | 0.0 | 0.0 | 0.5 | 10.0 | 100 |
| Example 4 | 85.0 | 1.7 | 0.0 | 0.0 | 0.0 | 3.0 | 10.3 | 100 |
| Example 5 | 87.0 | 1.8 | 0.0 | 0.0 | 0.0 | 3.0 | 8.2 | 100 |
| Example 6 | 86.0 | 2.0 | 0.0 | 0.0 | 0.0 | 3.5 | 8.5 | 100 |
| Example 7 | 86.0 | 2.8 | 0.0 | 0.0 | 0.0 | 1.5 | 9.7 | 100 |
| Example 8 | 83.0 | 2.7 | 0.0 | 0.0 | 0.0 | 5.2 | 9.1 | 100 |
| Example 9 | 83.0 | 3.0 | 0.0 | 0.0 | 0.0 | 4.5 | 9.5 | 100 |
| Example 10 | 86.0 | 3.5 | 0.0 | 0.0 | 0.0 | 1.0 | 9.5 | 100 |
| Example 11 | 88.0 | 0.0 | 1.5 | 0.0 | 0.0 | 3.0 | 7.5 | 100 |
| Example 12 | 90.0 | 0.0 | 2.0 | 0.0 | 0.0 | 2.8 | 5.2 | 100 |
| Example 13 | 85.0 | 0.0 | 2.5 | 0.0 | 0.0 | 3.3 | 9.2 | 100 |
| Example 14 | 84.0 | 0.0 | 3.0 | 0.0 | 0.0 | 3.5 | 9.5 | 100 |
| Example 15 | 85.2 | 0.5 | 1.0 | 0.0 | 0.0 | 3.0 | 10.3 | 100 |
| Example 16 | 86.2 | 1.4 | 2.0 | 0.0 | 0.0 | 4.0 | 6.4 | 100 |
| Comparative Example 1 | 98.0 | 0.0 | 0.0 | 0.0 | 0.0 | 0.0 | 2.0 | 100 |
| Comparative Example 2 | 98.0 | 0.0 | 0.0 | 0.2 | 0.0 | 0.1 | 1.7 | 100 |
| Comparative Example 3 | 83.0 | 0.0 | 0.0 | 1.2 | 0.0 | 8.0 | 7.8 | 100 |
| Comparative Example 4 | 84.5 | 0.0 | 0.0 | 2.1 | 0.0 | 4.2 | 9.2 | 100 |
| Comparative Example 5 | 87.0 | 0.0 | 0.0 | 0.0 | 0.0 | 0.0 | 13.0 | 100 |
| Comparative Example 6 | 89.0 | 0.0 | 0.0 | 0.0 | 3.0 | 0.5 | 7.5 | 100 |

TABLE 3

| | Particle Diameter (nm) | | | Open Porosity (%) | NO Adsorption (μmol/g) | NO Oxidation Temperature (°C.) |
|---|---|---|---|---|---|---|
| | $Fe_xMn_yO_4$ | $Co_3O_4$ | $CeO_2$ | | | |
| Example 1 | 15 | None | 20 | 64 | 0.02 | 510 |
| Example 2 | 30 | None | 65 | 62 | 0.02 | 510 |
| Example 3 | 50 | None | 80 | 60 | 0.03 | 520 |
| Example 4 | 17 | None | 20 | 60 | 0.05 | 500 |
| Example 5 | 15 | None | 18 | 62 | 0.04 | 500 |
| Example 6 | 20 | None | 35 | 58 | 0.04 | 500 |
| Example 7 | 45 | None | 60 | 58 | 0.03 | 500 |
| Example 8 | 50 | None | 70 | 62 | 0.03 | 510 |
| Example 9 | 22 | None | 35 | 57 | 0.06 | 480 |
| Example 10 | 1000 | None | 2000 | 58 | 0.01 | 530 |
| Example 11 | None | 20 | 60 | 60 | 0.02 | 520 |
| Example 12 | None | 18 | 25 | 62 | 0.03 | 510 |
| Example 13 | None | 17 | 22 | 60 | 0.04 | 490 |
| Example 14 | None | 15 | 20 | 58 | 0.04 | 500 |
| Example 15 | 30 | 20 | 80 | 60 | 0.02 | 510 |
| Example 16 | 50 | 35 | 100 | 58 | 0.03 | 500 |
| Comparative Example 1 | None | None | None | 60 | 0.00 | 540 |
| Comparative Example 2 | None | None | 80 | 60 | 0.00 | 540 |
| Comparative Example 3 | None | None | 80 | 60 | 0.00 | 540 |
| Comparative Example 4 | None | None | 80 | 59.5 | 0.00 | 540 |
| Comparative Example 5 | 5000 | None | None | 58 | 0.00 | 540 |
| Comparative Example 6 | None | None | 80 | 64 | 0.00 | 540 |

In Examples 1 to 10, the Fe content is higher than or equal to 0.1 mass % and lower than or equal to 3.0 mass % in terms of $Fe_2O_3$, the Mn content is higher than or equal to 0.1 mass % and lower than or equal to 3.0 mass % in terms of $Mn_2O_3$, and the Ce content is higher than or equal to 0.1 mass % and lower than or equal to 10 mass % in terms of $CeO_2$. Moreover, in Examples 1 to 10, the porous ceramic structure 1 substantially does not contain Co, and the Co content in the porous ceramic structure 1 is 0.0 mass % in terms of $Co_3O_4$. The Fe/Mn/Co ratio (i.e., the ratio of the sum of the Fe content in terms of $Fe_2O_3$, the Mn content in terms of $Mn_2O_3$, and the Co content in terms of $Co_3O_4$ to the Ce content in terms of $CeO_2$) is higher than or equal to 0.8 and lower than or equal to 9.5.

In Examples 11 to 14, the porous ceramic structure 1 substantially does not contain Fe and Mn, and the Fe content is 0.0 mass % in terms of $Fe_2O_3$, and the Mn content is 0.0 mass % in terms of $Mn_2O_3$. The Co content is higher than or equal to 0.2 mass % and lower than or equal to 6.0 mass % in terms of $Co_3O_4$, and the Ce content is higher than or equal to 0.1 mass % and lower than or equal to 10 mass % in terms of $CeO_2$. The Fe/Mn/Co ratio (i.e., the ratio of the sum of the Fe content in terms of $Fe_2O_3$, the Mn content in terms of $Mn_2O_3$, and the Co content in terms of $Co_3O_4$ to the Ce content in terms of $CeO_2$) is higher than or equal to 0.8 and lower than or equal to 9.5. In this case, the Fe/Mn/Co ratio is substantially the ratio of the Co content in terms of $Co_3O_4$ to the Ce content in terms of $CeO_2$.

In Examples 15 to 16, the Fe content is higher than or equal to 0.1 mass % and lower than or equal to 3.0 mass % in terms of $Fe_2O_3$, the Mn content is higher than or equal to 0.1 mass % and lower than or equal to 3.0 mass % in terms of $Mn_2O_3$, the Co content is higher than or equal to 0.1 mass % and lower than or equal to 3.0 mass % in terms of $Co_3O_4$, and the Ce content is higher than or equal to 0.1 mass % and lower than or equal to 10 mass % in terms of $CeO_2$. The Fe/Mn/Co ratio (i.e., the ratio of the sum of the Fe content in terms of $Fe_2O_3$, the Mn content in terms of $Mn_2O_3$, and the Co content in terms of $Co_3O_4$ to the Ce content in terms of $CeO_2$) is higher than or equal to 0.8 and lower than or equal to 9.5.

Figure 9:
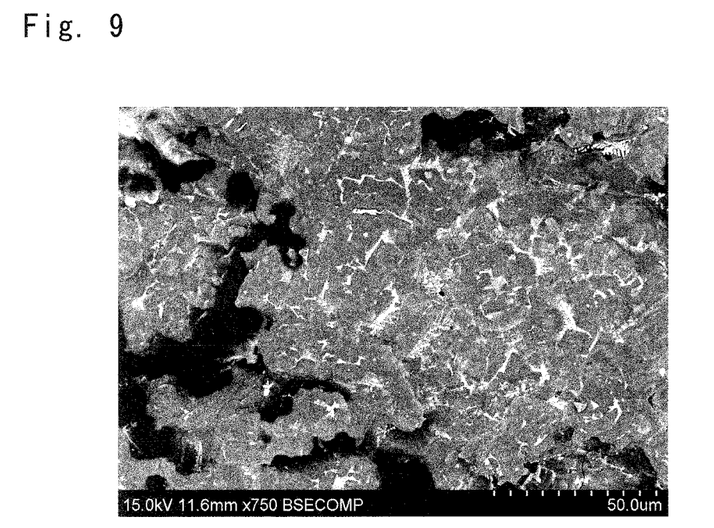
FIG. 9 shows an SEM image of the surface of a porous ceramic structure according to an example.
Figure 10:
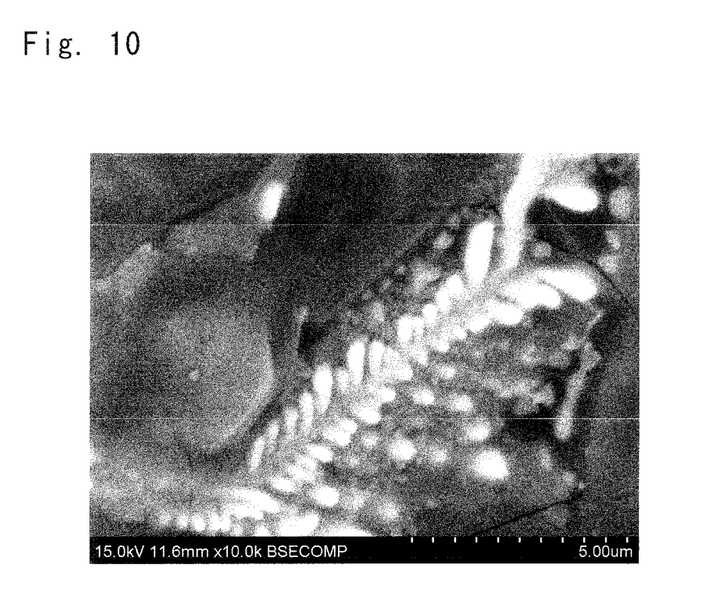
FIG. 10 shows an enlarged SEM image of the surface of a pore in the porous ceramic structure according to the example.
Figure 11:
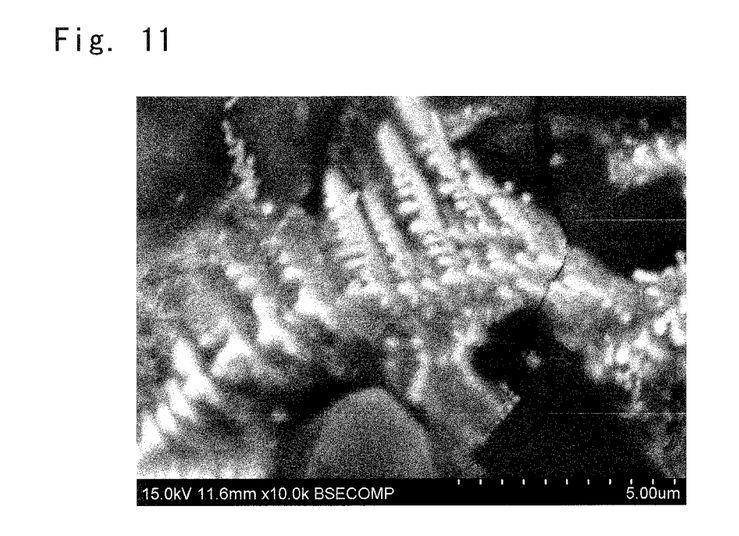
FIG. 11 shows an enlarged SEM image of the surface of the porous ceramic structure according to the example.
Figure 12:
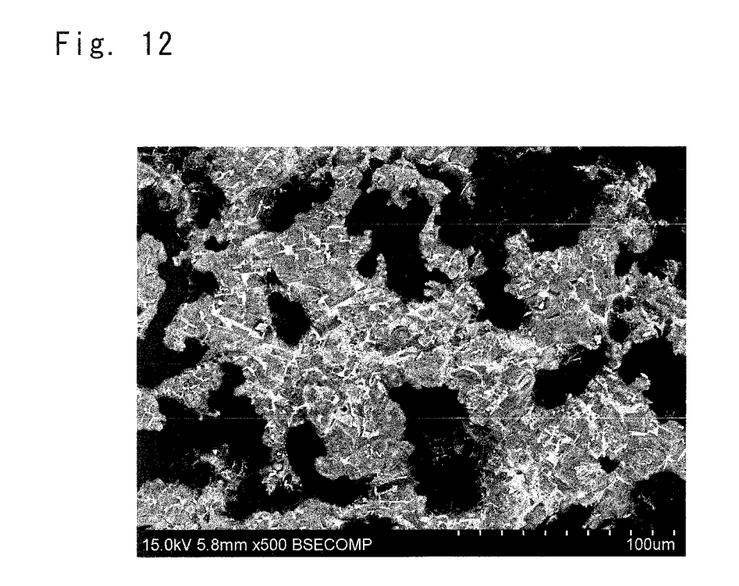
FIG. 12 shows an SEM image of the surface of a porous ceramic structure according to another example.
Figure 13:
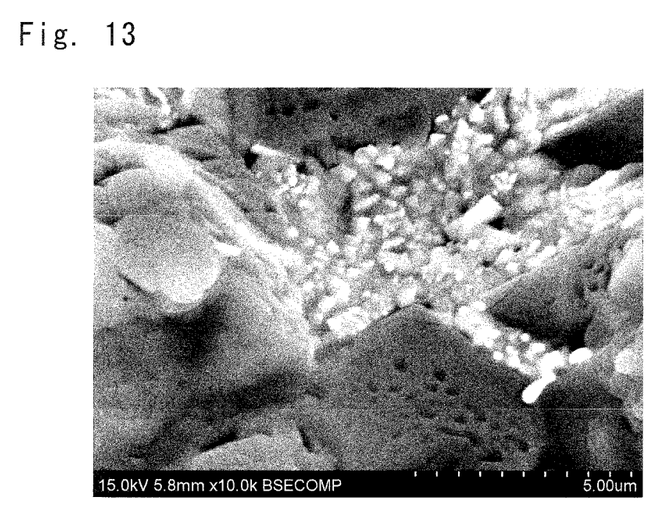
FIG. 13 shows an enlarged SEM image of the surface of a pore in the porous ceramic structure according to the example.

FIG. 9 shows an SEM image of the surface of the porous ceramic structure 1 according to Example 1. In FIG. 9, black portions indicate the pores 121, gray portions indicate the honeycomb structure 10, and white portions indicate the metal oxide particles 2 and the cerium-containing particles 3 (the same applies to FIG. 12). FIGS. 10 and 11 show enlarged SEM images of the surface of a pore 121 in the porous ceramic structure 1 according to Example 1. FIG. 12 shows an SEM image of the surface of the porous ceramic structure 1 according to Example 8. FIG. 13 shows an enlarged SEM image of the surface of a pore 121 in the porous ceramic structure 1 according to Example 8. In FIGS. 9 to 13, the metal oxide particles 2 and the cerium-containing particles 3 exist on the surfaces of the pores 121 in the porous ceramic structure 1.

In Examples 1 to 16, the open porosity is in the range of 57% to 64% and relatively high, so that pressure loss in the porous ceramic structure 1 is kept low. In Examples 1 to 16, the NO adsorption is higher than or equal to 0.01 (μmol/g), and the NO oxidation temperature is in the range of 480° C. to 530° C. and low. This indicates that the porous ceramic structure 1 can achieve high catalytic performance.

In particular, in Examples 4 to 7 and 9, the Fe content is higher than or equal to 1.5 mass % and lower than or equal to 3.0 mass % in terms of $Fe_2O_3$, the Mn content is higher than or equal to 1.5 mass % and lower than or equal to 3.0 mass % in terms of $Mn_2O_3$, and the Ce content is higher than or equal to 1.5 mass % and lower than or equal to 4.5 mass % in terms of $CeO_2$. The Fe/Mn/Co ratio is higher than or equal to 1.0 and lower than or equal to 4.0. In Examples 4 to 7 and 9, the NO oxidation temperature is still lower, i.e., lower than or equal to 500° C. This indicates that the porous ceramic structure 1 can achieve higher catalytic performance.

In Examples 12 to 14, the porous ceramic structure 1 substantially does not contain Fe and Mn, and the Co content is higher than or equal to 3.0 mass % and lower than or equal to 6.0 mass % in terms of $Co_3O_4$, and the Ce content is higher than or equal to 1.5 mass % and lower than or equal to 4.5 mass % in terms of $CeO_2$. The Fe/Mn/Co ratio is higher than or equal to 1.0 and lower than or equal to 4.0. In Examples 12 to 14, the NO oxidation temperature is still lower, i.e., lower than or equal to 510° C. This indicates that the porous ceramic structure 1 can achieve higher high catalytic performance.

In Example 16, the Fe content is higher than or equal to 1.5 mass % and lower than or equal to 3.0 mass % in terms of $Fe_2O_3$, the Mn content is higher than or equal to 1.5 mass % and lower than or equal to 3.0 mass % in terms of $Mn_2O_3$, the Co content is higher than or equal to 1.5 mass % and lower than or equal to 3.0 mass % in terms of $Co_3O_4$, and the Ce content is higher than or equal to 1.5 mass % and lower than or equal to 4.5 mass % in terms of $CeO_2$. The Fe/Mn/Co ratio is higher than or equal to 1.0 and lower than or equal to 4.0. In Example 16, the NO oxidation temperature is 500° C. and still lower. This indicates that the porous ceramic structure 1 can achieve higher catalytic performance.

Figure 14:
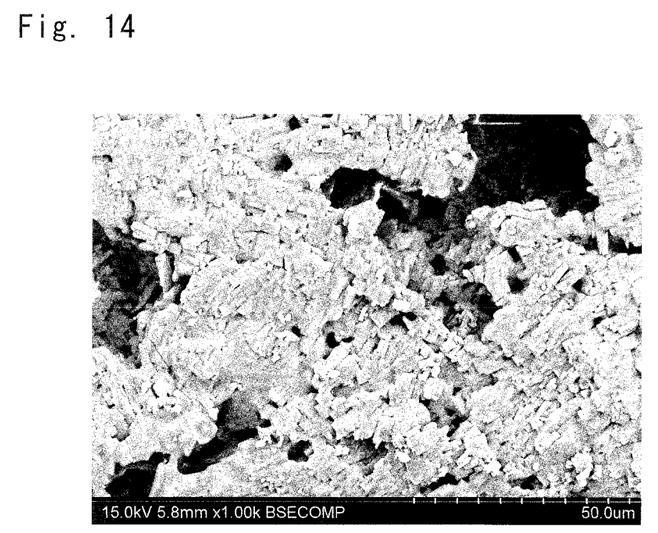
FIG. 14 shows an SEM image of the surface of a porous ceramic structure according to a comparative example.

On the other hand, Comparative Example 1 shows a test result for only the honeycomb structure 10 that is made of cordierite and does not contain the cerium-containing particles 3 and the metal oxide particles 2. FIG. 14 shows an SEM image of the surface of the porous ceramic structure 1 according to Comparative Example 1. In FIG. 14, the porous ceramic structure 1 is composed of only cordierite crystals as described above. In Comparative Example 2, the Fe content in terms of $Fe_2O_3$ and the Mn content in terms of $Mn_2O_3$ are both less than 0.1 mass %. In Comparative Examples 3, 4, and 6, the Fe/Mn/Co ratio is less than 0.8. In Comparative Example 5, the Ce content is less than 0.1 mass % in terms of $CeO_2$. In Comparative Examples 1 to 6, the NO adsorption is 0.00 (μmol/g) and low, and the NO oxidation temperature is 540° C. and relatively high. This indicates that the porous ceramic structures exhibit lower catalytic performance than in Examples 1 to 16.

As described above, the porous ceramic structure 1 includes the honeycomb structure 10, the cerium-containing particles 3, and the metal oxide particles 2. The honeycomb structure 10 is a porous structure body composed primarily of cordierite. The cerium-containing particles 3 are fixedly attached to the honeycomb structure 10. The metal oxide particles 2 contain at least one of Fe, Mn, and Co and are fixedly attached to the insides of the gas cavities (i.e., pores 121) in the honeycomb structure 10. The metal oxide particles 2 include the fixedly attached portions 21 and the protrusions 22. The fixedly attached portions 21 are located within the honeycomb structure 10. The protrusions 22 are contiguous with the fixedly attached portions 21 and protrude into the pores 121. When the porous ceramic structure 1 contains Fe, the Fe content is higher than or equal to 0.1 mass % and lower than or equal to 3.0 mass % in terms of $Fe_2O_3$, and when the porous ceramic structure 1 contains Mn, the Mn content is higher than or equal to 0.1 mass % and lower than or equal to 3.0 mass % in terms of $Mn_2O_3$. When the porous ceramic structure 1 contains Co together with Fe or Mn, the Co content is higher than or equal to 0.1 mass % and lower than or equal to 3.0 mass % in terms of $Co_3O_4$, and when the porous ceramic structure 1 contains Co without containing Fe and Mn, the Co content is higher than or equal to 0.2 mass % and lower than or equal to 6.0 mass % in terms of $Co_3O_4$. The Ce content is higher than or equal to 0.1 mass % and lower than or equal to 10 mass % in terms of $CeO_2$. The ratio of the sum of the Fe content in terms of $Fe_2O_3$, the Mn content in terms of $Mn_2O_3$, and the Co content in terms of $Co_3O_4$ to the Ce content in terms of $CeO_2$ (i.e., Fe/Mn/Co ratio) is higher than or equal to 0.8 and lower than or equal to 9.5.

Accordingly, it is possible to reduce pressure loss in the porous ceramic structure 1 and to increase the $NO_2$ conversion rate of the porous ceramic structure 1. It is also possible to reduce the NO combustion temperature in the porous ceramic structure 1. Moreover, the conversion rate of converting CO into $CO_2$ and the conversion rate of converting CH into $CO_2$ and $H_2O$ can be increased. In other words, the above configuration allows the porous ceramic structure 1 to achieve low pressure loss and high catalytic performance.

The method of producing the porous ceramic structure 1 includes the step of preparing a green body by mixing a material for the structure body (i.e., honeycomb structure 10) composed primarily of cordierite and a metal material that contains least one of Fe, Mn, and Co (step S11), the step of molding the green body into a compact (step S12), and the step of firing the compact to obtain the porous ceramic structure 1 that includes the porous honeycomb structure 10 composed primarily of cordierite, the cerium-containing particles 3 fixedly attached to the honeycomb structure 10, and the metal oxide particles 2 containing at least one of Fe, Mn, and Co and fixedly attached to the surfaces of the gas cavities (i.e., pores 121) in the honeycomb structure 10 (step S13). Accordingly, the porous ceramic structure 1 with low pressure loss and high catalytic performance can be readily produced.

As described above, when the porous ceramic structure 1 contains Fe, the Fe content is higher than or equal to 1.5 mass % and lower than or equal to 3.0 mass % in terms of $Fe_2O_3$, and when the porous ceramic structure 1 contains Mn, the Mn content is higher than or equal to 1.5 mass % and lower than or equal to 3.0 mass % in terms of $Mn_2O_3$. When the porous ceramic structure 1 contains Co together with Fe or Mn, the Co content is higher than or equal to 1.5 mass % and lower than or equal to 3.0 mass % in terms of $Co_3O_4$, and when the porous ceramic structure 1 contains Co without containing Fe and Mn, the Co content is higher than or equal to 3.0 mass % and lower than or equal to 6.0 mass % in terms of $Co_3O_4$. The Ce content is higher than or equal to 1.5 mass % and lower than or equal to 4.5 mass % in terms of $CeO_2$. The ratio of the sum of the Fe content in terms of $Fe_2O_3$, the Mn content in terms of $Mn_2O_3$, and the Co content in terms of $Co_3O_4$ to the Ce content in terms of $CeO_2$ (i.e., Fe/Mn/Co ratio) is preferably higher than or equal to 1.0 and lower than or equal to 4.0. Accordingly, the porous ceramic structure 1 can achieve higher catalytic performance.

As described above, the metal oxide particles 2 are preferably particles of an oxide having a spinel structure that contains at least one of Fe, Mn, and Co. In this case, the porous ceramic structure 1 can suitably achieve high catalytic performance. More preferably, the metal oxide particles 2 are particles of an oxide having a spinel structure that contains Fe, Mn, and oxygen, or particles of an oxide having a spinel structure that contains Co and oxygen. In this case, the porous ceramic structure 1 can achieve still higher catalytic performance. In the porous ceramic structure 1, the Fe/Mn/Co ratio is higher than or equal to 0.8 and lower than or equal to 9.5 as described above. Therefore, the aforementioned particles of an oxide having a spinel structure can be suitably generated during the production of the porous ceramic structure 1.

As described above, when the metal oxide particles 2 are particles of an oxide having a spinel structure that contains Fe, Mn, and oxygen or particles of an oxide having a spinel structure that contains Co and oxygen, the content of the metal oxide particles 2 is preferably higher than or equal to 0.1 mass % and lower than or equal to 5.0 mass %. In this case, the porous ceramic structure 1 can suitably achieve both a reduction in pressure loss and an improvement in catalytic performance. The mean particle diameter of the metal oxide particles 2 is preferably greater than or equal to 10 nm and less than or equal to 1 μm. In this case, the porous ceramic structure 1 can suitably achieve both a reduction in pressure loss and an improvement in catalytic performance in the same manner as described above.

The porous ceramic structure 1 and the method of producing the porous ceramic structure 1 described above may be modified in various ways.

For example, the mean particle diameter of the metal oxide particles 2 may be less than 10 nm, or may be greater than 1 μm. The content of the metal oxide particles 2 in the porous ceramic structure 1 may be lower than 0.1 mass %, or may be higher than 5.0 mass %.

The metal oxide particles 2 may be particles of an oxide having a spinel structure that contains only one of Fe and Mn. The metal oxide particles 2 may also be particles of an oxide having a spinel structure that contains Fe and Co without containing Mn, or may be particles of an oxide having a spinel structure that contains Mn and Co without containing Fe. The metal oxide particles 2 may also be particles of an oxide having a spinel structure that contains all of Fe, Mn, and Co. The metal oxide particles 2 does not necessarily have to be particles of an oxide having a spinel structure, and may be particles of an oxide having another crystal structure. The metal oxide particles 2 may contain a metal other than Fe, Mn, and Co.

In the porous ceramic structure 1, particles other than the cerium-containing particles 3 and the metal oxide particles 2 may be fixedly attached to the honeycomb structure 10 (i.e., structure body).

In the porous ceramic structure 1, the shape of the structure body described above is not limited to a honeycomb shape, and may be any of various shapes (i.e., generally cylindrical shape) other than the honeycomb shape.

The method of producing the porous ceramic structure 1 is not limited to the method described above, and may be modified in various ways.

The porous ceramic structure 1 may be used in applications other than CSFs of DPFs.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

INDUSTRIAL AVAILABILITY

The present invention is applicable to filters that collect particulate matter such as DFPs that collect particulate matter in exhaust gases emitted from diesel engines.

REFERENCE SIGNS LIST

1 Porous ceramic structure
2 Metal oxide particles
3 Cerium-containing particles
10 Honeycomb structure
21 Fixedly attached portion
22 Protrusion
S11 to S13 Step

The invention claimed is:

1. A porous ceramic structure comprising:
a porous structure body composed primarily of cordierite;
cerium-containing particles fixedly attached to said structure body; and
metal oxide particles containing at least one of iron, manganese, and cobalt and each fixedly attached to an inside of a pore of said structure body,
wherein said metal oxide particles have:
a fixedly attached portion located within said structure body; and
a protrusion contiguous with said fixedly attached portion and protruding into said pore,
when said porous ceramic structure contains iron, an iron content in said porous ceramic structure is higher than or equal to 0.1 mass % and lower than or equal to 3.0 mass % in terms of $Fe_2O_3$,
when said porous ceramic structure contains manganese, a manganese content in said porous ceramic structure is higher than or equal to 0.1 mass % and lower than or equal to 3.0 mass % in terms of $Mn_2O_3$,
when said porous ceramic structure contains cobalt together with iron or manganese, a cobalt content in said porous ceramic structure is higher than or equal to 0.1 mass % and lower than or equal to 3.0 mass % in terms of $Co_3O_4$,
when said porous ceramic structure contains cobalt without containing iron and manganese, the cobalt content in said porous ceramic structure is higher than or equal to 0.2 mass % and lower than or equal to 6.0 mass % in terms of $Co_3O_4$,
a cerium content in said porous ceramic structure is higher than or equal to 0.1 mass % and lower than or equal to 10 mass % in terms of $CeO_2$, and
a ratio of a sum of the iron content in terms of $Fe_2O_3$, the manganese content in terms of $Mn_2O_3$, and the cobalt content in terms of $Co_3O_4$ to the cerium content in terms of $CeO_2$ is higher than or equal to 0.8 and lower than or equal to 9.5.

2. The porous ceramic structure according to claim 1, wherein
when said porous ceramic structure contains iron, the iron content in said porous ceramic structure is higher than or equal to 1.5 mass % and lower than or equal to 3.0 mass % in terms of $Fe_2O_3$,
when said porous ceramic structure contains manganese, the manganese content in said porous ceramic structure is higher than or equal to 1.5 mass % and lower than or equal to 3.0 mass % in terms of $Mn_2O_3$,
when said porous ceramic structure contains cobalt together with iron or manganese, the cobalt content in said porous ceramic structure is higher than or equal to 1.5 mass % and lower than or equal to 3.0 mass % in terms of $Co_3O_4$,
when said porous ceramic structure contains cobalt without containing iron and manganese, the cobalt content in said porous ceramic structure is higher than or equal to 3.0 mass % and lower than or equal to 6.0 mass % in terms of $Co_3O_4$,
the cerium content in said porous ceramic structure is higher than or equal to 1.5 mass % and lower than or equal to 4.5 mass % in terms of $CeO_2$, and
the ratio of the sum of the iron content in terms of $Fe_2O_3$, the manganese content in terms of $Mn_2O_3$, and the cobalt content in terms of $Co_3O_4$ to the cerium content in terms of $CeO_2$ is higher than or equal to 1.0 and lower than or equal to 4.0.

3. The porous ceramic structure according to claim 1, wherein
said metal oxide particles are particles of an oxide having a spinel structure that contains at least one of iron, manganese, and cobalt.

4. The porous ceramic structure according to claim 3, wherein
said metal oxide particles are particles of an oxide having a spinel structure that contains iron, manganese, and oxygen or particles of an oxide having a spinel structure that contains cobalt and oxygen.

5. The porous ceramic structure according to claim 4, wherein
a content of said metal oxide particles is higher than or equal to 0.1 mass % and lower than or equal to 5.0 mass %.

6. The porous ceramic structure according to claim 4, wherein
said metal oxide particles have a mean particle diameter greater than or equal to 10 nm and less than or equal to 1 μm.

* * * * *